(12) United States Patent
Matsushima et al.

(10) Patent No.: US 8,909,459 B2
(45) Date of Patent: Dec. 9, 2014

(54) KNOCK CONTROL APPARATUS FOR INTERNAL COMBUSTION ENGINE

(75) Inventors: Yuhei Matsushima, Chiyoda-ku (JP); Keitaro Ezumi, Aki-gun (JP); Tomokuni Kusunoki, Aki-gun (JP); Atsushi Inoue, Aki-gun (JP); Hiroki Morimoto, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 304 days.

(21) Appl. No.: 13/612,016

(22) Filed: Sep. 12, 2012

(65) Prior Publication Data

US 2013/0166183 A1 Jun. 27, 2013

(30) Foreign Application Priority Data

Dec. 26, 2011 (JP) ................. 2011-282659

(51) Int. Cl.
| | |
|---|---|
| *F02D 45/00* | (2006.01) |
| *F02D 35/02* | (2006.01) |
| *F02D 41/24* | (2006.01) |
| *G01L 23/22* | (2006.01) |
| *F02P 5/152* | (2006.01) |
| *F02D 41/28* | (2006.01) |

(52) U.S. Cl.
CPC ............. *F02D 45/00* (2013.01); *F02D 35/027* (2013.01); *G01L 23/221* (2013.01); *F02D 41/2416* (2013.01); *F02D 2041/286* (2013.01)
USPC ........................................ 701/111

(58) Field of Classification Search
CPC ... F02D 41/2416; F02D 45/00; F02D 35/027; F02D 2041/286; G01L 23/221
USPC ........ 701/111, 102, 114; 123/406.16, 406.29, 123/406.34, 406.37–406.39; 73/35.01, 73/35.04, 35.07–35.13
See application file for complete search history.

(56) References Cited

U.S. PATENT DOCUMENTS

| | | | |
|---|---|---|---|
| 7,043,353 B2 | 5/2006 | Takemura et al. | |
| 7,054,735 B2* | 5/2006 | Masuda et al. | ................. 701/111 |
| 2012/0080008 A1 | 4/2012 | Matsushima et al. | |
| 2013/0151128 A1* | 6/2013 | Ono et al. | .................... 701/111 |

FOREIGN PATENT DOCUMENTS

JP 4390104 B2 12/2009

* cited by examiner

*Primary Examiner* — Hieu T Vo
(74) *Attorney, Agent, or Firm* — Sughrue Mion, PLLC

(57) ABSTRACT

A knock control apparatus for an internal combustion engine includes a knock signal normalization portion that normalizes a knock signal using base statistics calculated on the basis of the knock signal. The knock signal normalization portion calculates base statistics on the basis of a last value and a current value of the knock signal and normalizes the knock signal using a base statistic interpolated according to an operating state.

4 Claims, 14 Drawing Sheets

FIG.12
(1)
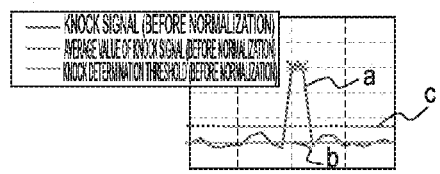
(2)-A
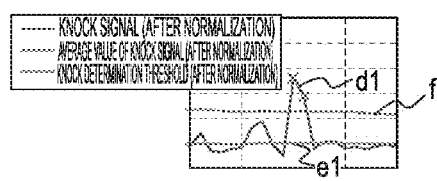
(2)-B
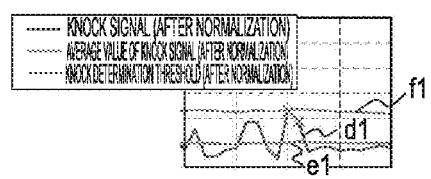
(3)-A
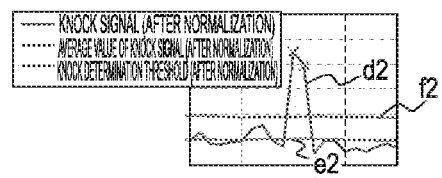
(3)-B
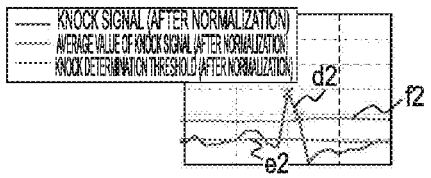
(4)-A
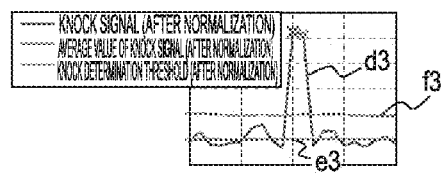
(4)-B
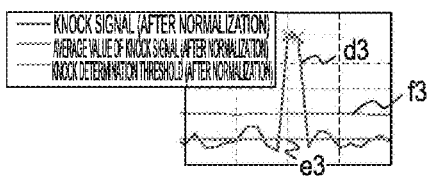

KNOCK CONTROL APPARATUS FOR INTERNAL COMBUSTION ENGINE

BACKGROUND OF THE INVENTION

1. Field of the Invention

The present invention relates to a knock control apparatus that controls a knock occurring in an internal combustion engine.

2. Background Art

There is a method of detecting a knocking phenomenon occurring in an internal combustion engine using a vibration sensor (hereinafter, referred to as the knock sensor) directly attached to a block of the internal combustion engine. The idea underlying this method is as follows. That is, when a knock occurs while the internal combustion engine is in operation, vibrations in a specific frequency band are known to occur according to a bore diameter of the internal combustion engine or a vibration mode of the knock. Hence, a knock is detected by measuring vibration intensity (hereinafter, referred to as the knock signal) at this specific frequency.

Also, there is a knock control apparatus that suppresses a knock when the knock is detected by correcting spark timing to shift to a retard side and minimizes a torque reduction when a knock is not detected by returning spark timing to an advance side. This apparatus is based on the idea as follows. That is, as a characteristic of the internal combustion engine, it is known that when spark timing is advanced, an output torque of the internal combustion engine is enhanced whereas a knock occurs more readily, and conversely, when spark timing is retarded, an output torque of the internal combustion engine is reduced whereas a knock hardly occurs. Hence, this knock control apparatus corrects spark timing by shifting spark timing to a retard side when a knock is detected and returns spark timing to an advance side when a knock is not detected, thereby controlling the internal combustion engine to operate at knock limit spark timing at which a largest torque is generated while the occurrence of a knock is suppressed.

It should be noted, however, that a knock may not occur even when spark timing is advanced to the extent that a torque reaches a maximum in a case where the internal combustion engine is operating at a low load. The knock control as above is not necessary in such an operating range.

In the knock control apparatus for an internal combustion engine configured as above, a knock determination threshold on the basis of which to determine a knock is generally set using a gain and an offset preliminarily matched to an average value of a knock signal calculated by filter processing or an average value and a standard deviation of a knock signal calculated by filter processing. However, the average value and the standard deviation of a knock signal vary with a change of an operating state of the internal combustion engine. Accordingly, there are problems that it takes a large number of man-hours to match a gain and the like to the average value in response to such a variance and that an erroneous knock detection or omission of a knock detection occurs because the knock determination threshold is not set adequately.

In order to overcome such problems, methods of providing an improvement for an erroneous knock detection and omission of a knock detection are proposed, for example, in Patent Document 1 and Patent Document 2. According to the disclosed methods, the knock determination threshold is set adequately by suppressing variances of an average value and a standard deviation of a knock signal caused by a change of the operating state by applying normalization (standardization or non-dimensionalization) to the knock signal.

RELATED ART DOCUMENT

Patent Documents

Patent Document 1: Japanese Patent No. 4390104
Patent Document 2: Japanese Patent Application No. 2010-224705

Patent Document 1 discloses a method of applying normalization in accordance with a typical standardization method using an average value and a standard deviation of a knock signal.

According to the configuration of Patent Document 1, normalization is applied to a knock signal so that the normalized knock signal has: average value=0 and standard deviation=1. Hence, variances of the average value and the standard deviation of the knock signal caused by a change of the operating state are suppressed. Consequently, the knock determination threshold is set adequately and an erroneous knock detection is improved. However, because normalization is applied using a standard deviation that is extremely highly correlated with a vibration component resulting from the occurrence of a knock, the vibration component resulting from the occurrence of a knock is normalized as well. This method therefore has problems that a correlation in magnitude between a knock actually occurring and a knock detected is lowered and that omission of a knock detection occurs.

In order to solve the problems of Patent Document 1 as above, Patent Document 2 discloses a method of applying normalization using an average value of a knock signal alone without using a standard deviation of the knock signal. According to the configuration of Patent Document 2, in comparison with a case where a standard deviation of the knock signal is used, it is possible to suppress normalization of a vibration component resulting from the occurrence of a knock. However, there still remains the problem that no small amount of vibration component resulting from the occurrence of a knock is normalized. Hence, in an operating state in which knocks occur successively, vibration components resulting from knocks at the second and subsequent occurrences are normalized further. Accordingly, there is a problem that a correlation in magnitude between a knock actually occurring and a knock detected is lowered.

SUMMARY OF THE INVENTION

The invention is devised to solve the problems of the apparatus in the related art as described above, and has an object to provide a knock control apparatus for an internal combustion engine capable of enhancing a knock detection performance by suppressing an erroneous knock detection by setting a knock determination threshold adequately in a case where an average value and a standard deviation of a knock signal vary with a change of an operating state and by preventing the occurrence of omission of a knock detection without lowering a correlation in magnitude between a knock occurred and a knock detected in an operating state in which knocks occur successively.

A knock control apparatus for an internal combustion engine according to an aspect of the invention includes: a sensor that outputs a signal corresponding to a combustion state of the internal combustion engine; a knock signal calculation portion that calculates, as a knock signal, a characteristic component of a knock using the output from the sensor at every spark timing; a knock signal normalization portion that normalizes the knock signal using a base statistic calculated on the basis of the knock signal; a knock determination threshold calculation portion that sets a knock determination threshold on the basis of the normalized knock signal; a knock determination portion that determines an occurrence of a knock in a case where the normalized knock signal exceeds the knock determination threshold set by the knock determination threshold calculation portion; and an operating state determination portion that determines an operating state of the internal combustion engine. The knock signal normalization portion calculates a base statistic 1 on the basis of a current value of the knock signal, a base statistic 2 on the basis of a last value of the knock signal, and a base statistic 3 by interpolating between the base statistic 1 and the base statistic 2 according to a determination result by the operating state determination portion. The knock signal normalization portion normalizes the knock signal using the calculated base statistic 3. The base statistic 3 is calculated in reference to the base statistic 2 in a state in which the operating state determination portion determines that the internal combustion engine is not in an operating state such that accompanies a variance of the knock signal, and in a state in which the operating state determination portion determines that the internal combustion engine is in an operating state such that accompanies a variance of the knock signal, influences of the base statistic 1 are calculated more significantly into the base statistic 3 as a measure of the variance of the knock signal increases.

The knock control apparatus for an internal combustion engine configured as above can achieve excellent advantages that it becomes possible to enhance a knock detection performance by suppressing an erroneous knock detection in a case where an average value and a standard deviation of a knock signal vary with a change of an operating state and by preventing the occurrence of omission of a knock detection without lowering a correlation in magnitude between a knock occurred and a knock detected in an operating state in which knocks occur in succession.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 12 shows operation examples of the normalization of a knock signal in a steady state with the occurrence of a knock according to the first embodiment of the invention;

DESCRIPTION OF THE PREFERRED EMBODIMENT

First Embodiment

Figure 1:
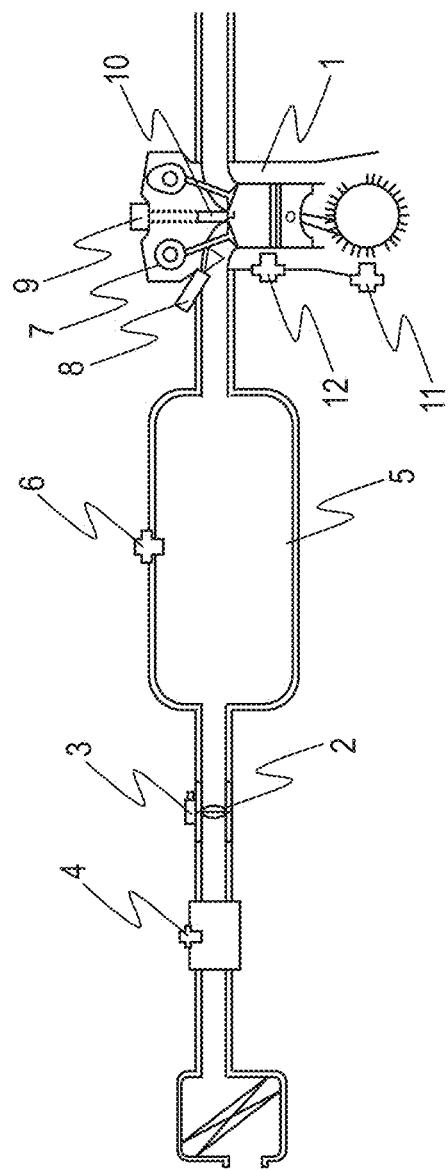
FIG. 1 is a view schematically showing a configuration of an overall internal combustion engine to which is applied a knock control apparatus for an internal combustion engine according to a first embodiment of the invention.
Figure 2:
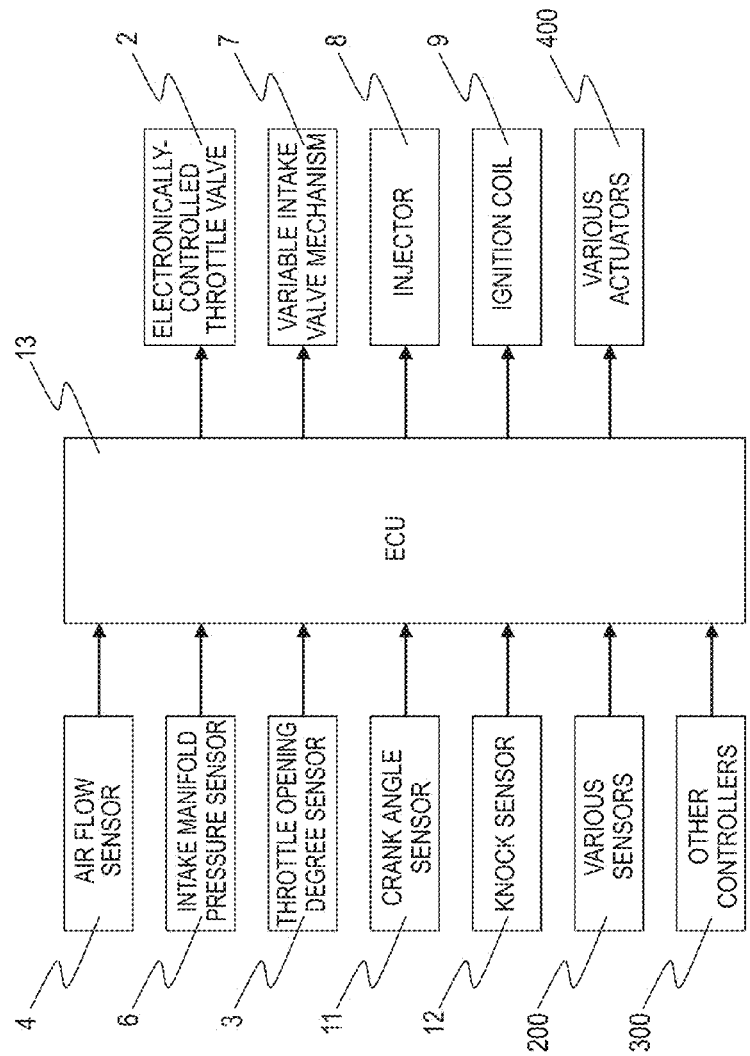
FIG. 2 is a block diagram schematically showing a configuration of a control portion of the internal combustion engine according to the first embodiment of the invention.

Hereinafter, a knock control apparatus for an internal combustion engine according to a first embodiment of the invention will be described in detail with reference to the drawings. FIG. 1 is a view schematically showing a configuration of an overall internal combustion engine to which is applied a knock control apparatus for an internal combustion engine according to the first embodiment of the invention. FIG. 2 is a block diagram schematically showing a configuration of a control portion of the internal combustion engine.

Referring to FIG. 1, an electronically-controlled throttle valve 2 electronically controlled to adjust an intake air flow is provided upstream of an intake system of an internal combustion engine (hereinafter, referred to as the engine) 1. Also, a throttle opening degree sensor 3 is provided to measure an opening degree of the electronically-controlled throttle valve 2. A mechanical throttle valve directly connected to an unillustrated accelerator pedal with a wire may be used instead of the electronically-controlled throttle valve 2.

An air flow sensor 4 that measures an intake air flow is provided upstream of the electronically-controlled throttle valve 2. An intake manifold pressure sensor 6 that measures an internal pressure of a surge tank 5 is provided downstream of the electrically-controlled throttle valve 2 on a side of the engine 1. It should be appreciated that either one or both of the air flow sensor 4 and the intake manifold pressure sensor 6 can be provided.

An intake valve is provided to an intake port located downstream of the surge tank 5 and a variable intake valve mechanism 7 capable of variably controlling closing and opening timings of the intake valve is attached to the intake valve. An injector 8 that injects fuel is provided to the intake port. The injector 8 may be provided so as to inject fuel directly into a cylinder of the engine 1. Further, the engine 1 is provided with an ignition coil 9 and a spark plug 10 used to ignite an air-fuel mixture in the cylinder of the engine 1, a crank angle sensor 11 used to detect an edge of a plate provided to a crack shaft to detect an engine rotation speed and a crank angle, and a knock sensor 12 used to detect vibrations of the engine 1.

Referring to FIG. 2, an intake air flow measured by the air flow sensor 4, an intake manifold pressure measured by the intake manifold pressure sensor 6, an opening degree of the electronically-controlled throttle valve 2 measured by the throttle opening degree sensor 3, a pulse in synchronization with the edge of the plate provided to the crank shaft and outputted from the crank angle sensor 11, a vibration waveform of the engine 1 measured by the knock sensor 12 are inputted into an electronic control unit (hereinafter, abbreviated to ECU) 13.

Measured values from various sensors 200 other than those described above are also inputted into the ECU 13. Further, signals from other controllers (for example, control systems for automatic transmission control, brake control, and traction control) 300 are also inputted into the ECU 13.

The ECU 13 controls the electronically-controlled throttle valve 2 by calculating a target throttle opening degree on the basis of an accelerator opening degree and according to an operating state of the engine 1. Also, according to a current operating state, the ECU 13 controls the variable intake valve mechanism 7 that variably controls closing and opening timings of the intake valve, drives the injector 8 to achieve a target air-fuel ratio, and energizes the ignition coil 9 to achieve target spark timing. In a case where a knock is detected by a method described below, the ECU 13 also performs control to suppress the occurrence of a knock by setting target spark timing on a retard side. Further, the ECU 13 calculates command values to various actuators 400 other than those described above.

Figure 3:
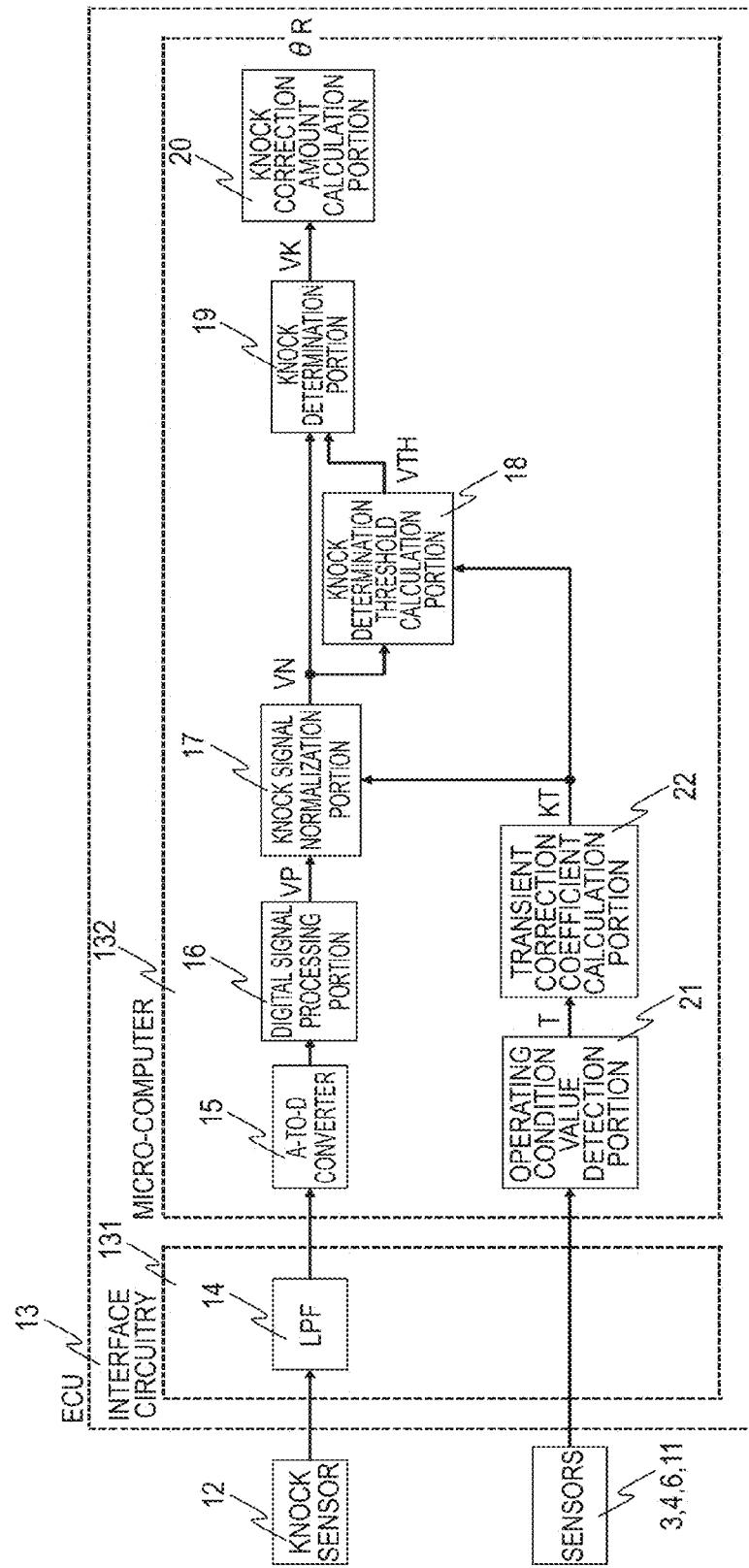
FIG. 3 is a block diagram schematically showing a knock control portion according to the first embodiment of the invention.

Knock control performed in the ECU 13 will now be described briefly with reference to FIG. 3. FIG. 3 is a block diagram showing a configuration of an overall knock control portion. Referring to FIG. 3, numerals 12 and 13 denote the knock sensor and the ECU, respectively, shown in FIG. 1 and FIG. 2.

A configuration of the knock control portion in the ECU 13 will be described first.

The ECU 13 is formed of interface circuitry 131 and a micro-computer 132. The micro-computer 132 is formed of an A-to-D converter 15 that converts an analog signal to a digital signal, a ROM region in which to store control programs and control constants, and a RAM region in which to store variables when a program is run.

Numeral 14 denotes a knock control interface circuit and it is a low-pass filter (LPF) that removes high frequency components from a signal output of the knock sensor 12. Numeral 15 denotes an A-to-D converter in the micro-computer 132. A-to-D conversion by the A-to-D converter 15 is performed at regular time intervals (for example, in every 10 μs or 20 μs). Because all vibration components are taken in the A-to-D converter 15, the LPF 14 is also furnished with a gain converting function, by which the LPF 14 is biased to 2.5 V (the center of the vibration components is set at 2.5 V), so that the vibration components are amplified with the center at 2.5 V when the vibration components are small and the vibration components are reduced with the center at 2.5 V when the vibration components are large, thereby allowing the vibration components to fall within a range of 0 to 5 V with the center at 2.5 V.

It may be configured in such a manner that this A-to-D conversion is performed constantly and data of only a period in which a knock occurs in the internal combustion engine, for example, a knock detection period set from a top death center (hereinafter, abbreviated to TDC) to 50° CA after a top death center (hereinafter, abbreviated to ATDC) of a piston may be sent to a digital signal processing portion 16 and beyond or A-to-D conversion may be performed only in the knock detection period set from TDC to 50° CA ATDC to send the resulting data to the digital signal processing portion 16 and beyond.

In the subsequent digital signal processing portion 16, a time-frequency analysis by digital signal processing is performed. A spectral series of a knock-specific frequency component in every certain time is calculated by the digital signal processing, for example, processing called discrete Fourier transform (DFT) or short-time Fourier transform (STFT). Alternatively, a knock-specific frequency component may be extracted by the digital signal processing using an IIR (Infinite Impulse Response) filter or an FIR (Finite Impulse Response) filter. A computation by the digital signal processing portion 16 may be performed while A-to-D conversion is performed or performed collectively by interruption processing in synchronization with rotations of the engine 1. A peak value of the spectral series calculated by the digital signal processing portion 16 is used as a knock signal VP in the subsequent processing.

A knock signal normalization portion 17 normalizes the knock signal VP by applying normalization processing described below with reference to FIG. 4 through FIG. 10 using a transient correction coefficient calculated by a transient correction coefficient calculation portion 22 and indicating whether an operating state of the engine 1 is a steady state or a transient state.

The micro-computer 132 includes an operating state value detection portion 21 that detects an operating state value T as output signals from the throttle opening degree sensor 3, the air flow sensor 4, the intake manifold pressure sensor 6, and the crank angle sensor 11 are inputted therein via the interface circuitry 131, and the transient correction coefficient calculation portion 22 as an operating state determination portion.

A subsequent knock determination threshold calculation portion 18 calculates a knock determination threshold VTH by applying processing expressed by Equation (1) through Equation (4) below to the normalized knock signal VN calculated in the knock signal normalization portion 17.

Firstly, the knock signal VN is averaged out by performing filter processing in accordance with the following equation:

$$VNA[n]=K1[n] \times VNA[n-1]+(1-K1[n]) \times VN[n] \qquad (1)$$

where VNA[n] is an average value of VN, VN[n] is a normalized knock signal, and K1[n] is a filter coefficient.

Herein, [n] means processing at the current spark timing and [n−1] means processing at the last spark timing.

Then, a dispersion and a standard deviation are calculated in accordance with the following equations:

$$VNV[n]=K2[n] \times VNV[n-1]+(1-K2[n]) \times (VN[n]-VNA[n])^2 \qquad (2)$$

$$VNS[n]=(VNV[n])^{1/2} \qquad (3)$$

where VNS[n] is a standard deviation of VN, VNV[n] is a dispersion of VN, and K2[n] is a filter coefficient.

A knock determination threshold is then calculated in accordance with the equation below using the average value and the standard deviation calculated as above:

$$VTH[n]=VAN[n]+KTH \times VNS[n] \qquad (4)$$

where VTH[n] is a knock determination threshold and KTH is a knock determination threshold correction coefficient.

Herein, assume that the filter coefficients K1[n] and K2[n] are variable according to a comparison result between the knock signal VN[n] and the last value of the knock determination threshold, VTH[n−1].

For example, in a case where VN[n]>VTH[n−1], the filter coefficient is set to a large value and in a case where VN[n]≤VTH[n−1], the filter coefficient is set to a small value. It should be noted, however, that the filter coefficients k1[n] and k2[n] are not made variable in response to an operating state of the engine 1. In addition, the knock determination threshold correction coefficient KTH is a preliminarily matched value according to a probability of a knock and generally set to a value of about 3.

A knock determination portion 19 determines an occurrence or a non-occurrence of a knock in accordance with the equation below and outputs a signal corresponding to intensity of the knock:

$$VK[n]=(VN[n]-VNA[n])/(VTH[n]-VNA[n]) \quad (5)$$

where VK[n] is intensity of a knock (the occurrence of a knock is determined when VK[n]>1).

A knock correction amount calculation portion 20 calculates an amount of retardation corresponding to intensity of a knock per ignition in accordance with the following equation:

$$\Delta\theta R[n]=\max(-VK[n]\times Kg[n], \theta\min) \quad (6)$$

where ΔθR[n] is an amount of retardation per ignition, Kg[n] is a retardation amount reflecting coefficient, and θmin is a maximum amount of retardation.

Further, an amount of retardation per ignition is added up to compute an amount of a knock correction at spark timing. It should be noted, however, that spark timing is returned to an advance side when there is no occurrence of a knock. An amount of a knock correction in consideration of the returning to an advance side is computed in accordance with the following equation:

$$\theta R[n]=\min(\theta R[n-1]+\Delta\theta R[n]+Ka, \theta\max) \quad (7)$$

where θR[n] is an amount of a knock correction, Ka[n] is a coefficient of returning to an advance side, and θmax is a maximum amount of advancement.

Final spark timing is calculated in accordance with the equation below using the amount of a knock correction, θR, computed as above:

$$\theta IG=\theta B+\theta R[n] \quad (8)$$

where θIG is final spark timing and θB is basic spark timing.

The above has described the processing method to achieve a knock detection using the result of a frequency analysis by the digital signal processing in the digital signal processing portion 16 through the transient correction coefficient calculation portion 22 and the knock control to control a knock by retarding spark timing.

The normalization processing performed in the first embodiment will now be described in detail using FIG. 4 through FIG. 9.

Figure 4:
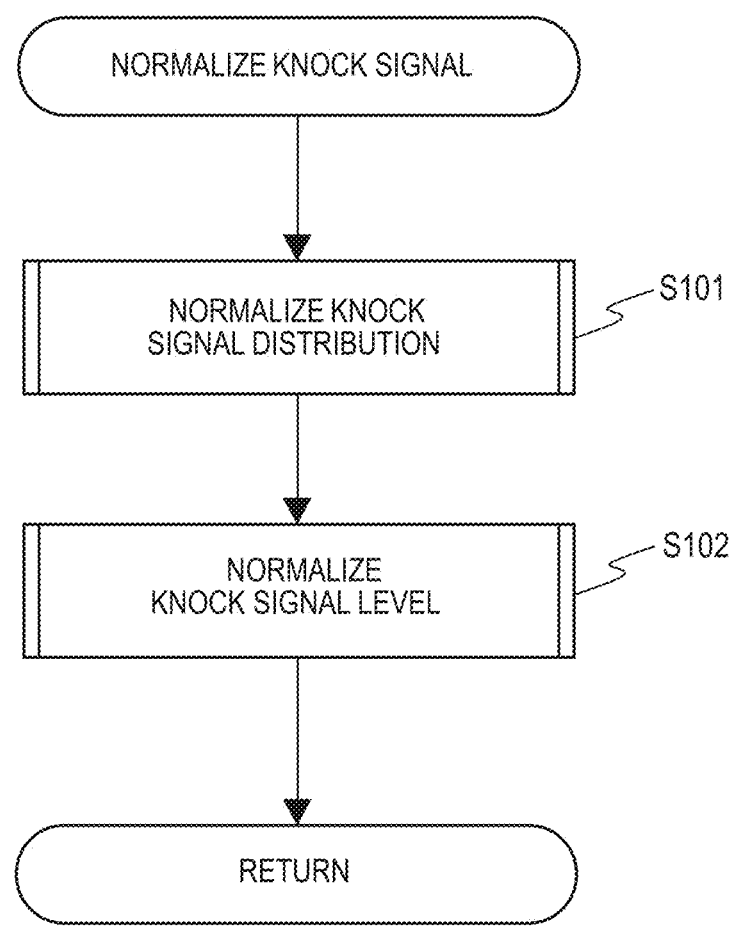
FIG. 4 is a flowchart depicting normalization of a knock signal according to the first embodiment of the invention.

As is depicted in FIG. 4, in the normalization processing in the first embodiment, normalization is applied first to a distribution of a knock signal in Step S101 and then to a level of the knock signal in Step S102.

Figure 5:
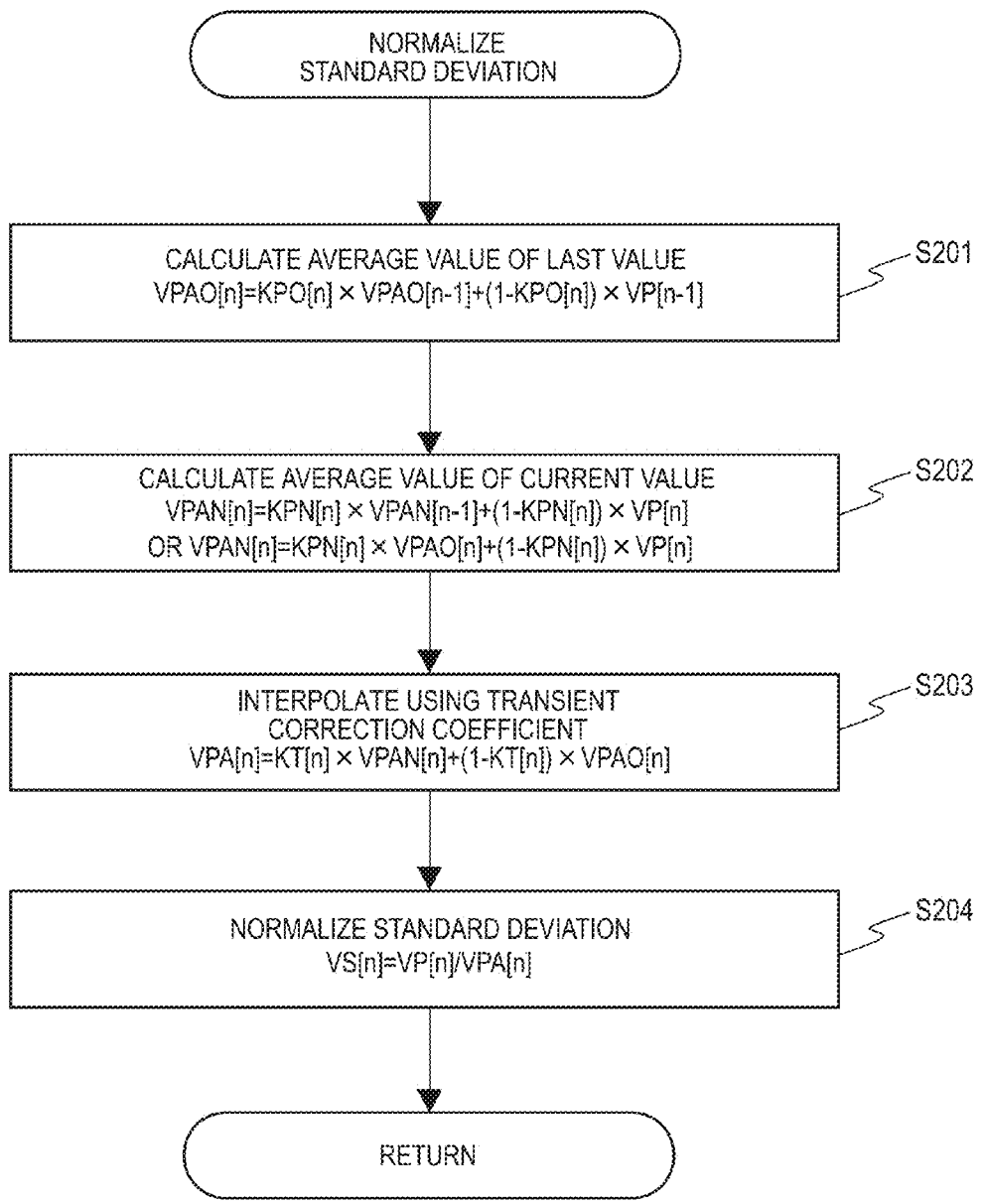
FIG. 5 is a flowchart depicting normalization of a knock signal distribution according to the first embodiment of the invention.
Figure 6:
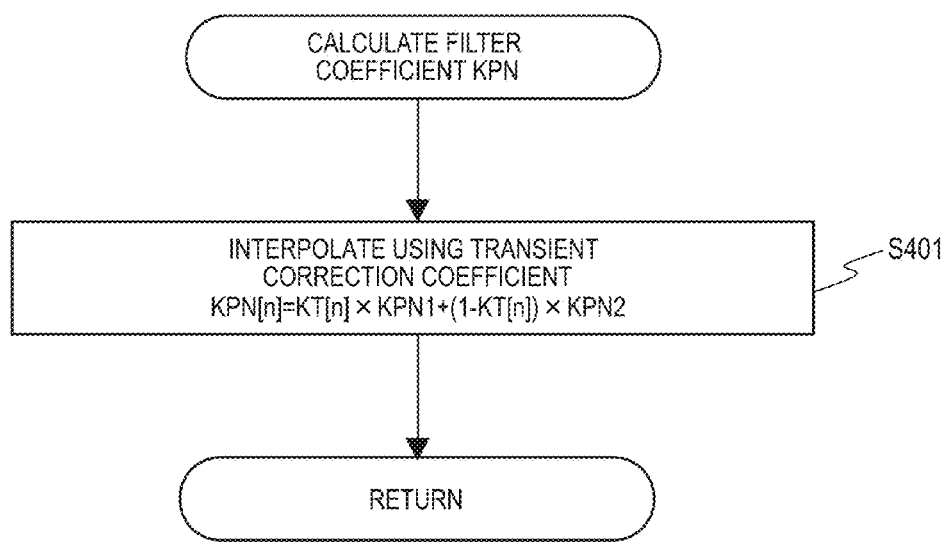
FIG. 6 is a flowchart depicting a calculation of a filter coefficient for distribution normalization according to the first embodiment of the invention.
Figure 7:
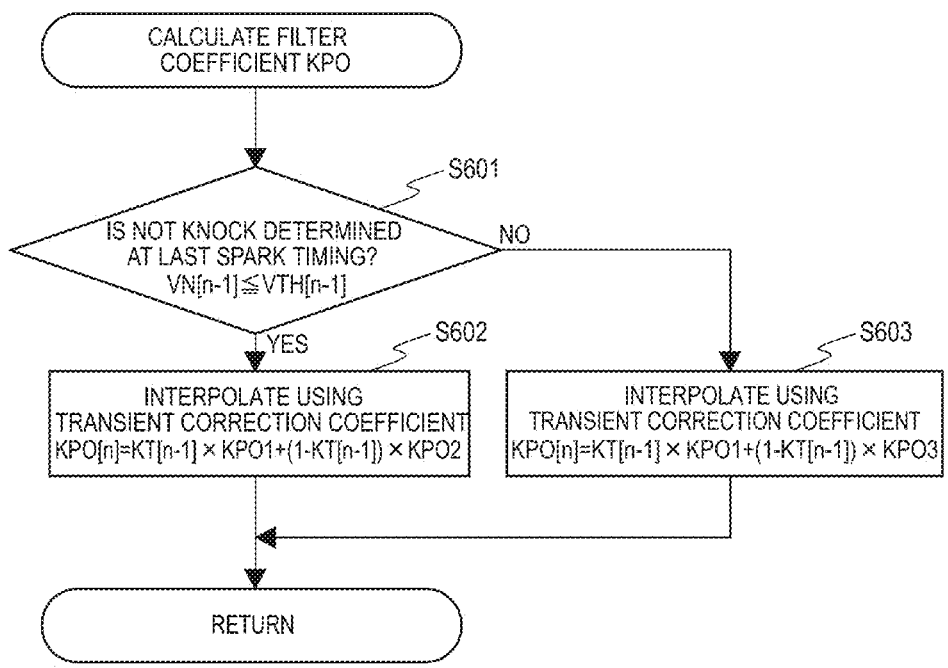
FIG. 7 is a flowchart depicting a calculation of a filter coefficient for distribution normalization according to the first embodiment of the invention.

Normalization of the knock signal distribution in Step S101 of FIG. 4 will now be described in detail using FIG. 5 through FIG. 7. In Step S201 of FIG. 5, the last value of the knock signal, VP[n−1], is averaged out by performing filter processing in every stroke.

A calculation method of a filter coefficient KPO[n] will now be described using the flowchart of FIG. 7.

Firstly in Step S601, it is determined whether a knock is determined at the last spark timing by comparing the last value of the normalized knock signal, VN[n−1], with the last value of the knock determination threshold, VTH[n−1]. In a case where it is found in Step S601 that a knock is not determined (if VN[n−1]≤VTH[n−1]), the flow proceeds to Step S602 in which the filter coefficient KPO[n] is calculated by performing an interpolation operation using the last value of a transient correction coefficient, KT[n−1].

In a case where it is found in Step S601 that a knock is determined (if VN[n−1]>VTH[n−1]), the flow proceeds to Step S603.

Herein, KPO1 is a filter coefficient matched to a transient operating state in which a highest responsiveness is required, KPO2 is a filter coefficient matched to a steady operating state, and KPO3 is a filter coefficient matched so that a vibration component resulting from a knock is excluded from the filter value. A value equal to or smaller than a value of KPN2 described below is set to KPO2. Owing to this setting, when a distribution of the knock signal is normalized on the basis of the average value of the last value of the knock signal, VP[n−1], normalization is unsusceptible to a vibration component resulting from the occurrence of a knock. Also, it becomes possible to normalize a distribution of the knock signal accurately even in a case where the transient correction coefficient and a variance of the knock signal have a low correlation or where the knock signal varies although the transient correction coefficient is not calculated.

Figure 11:
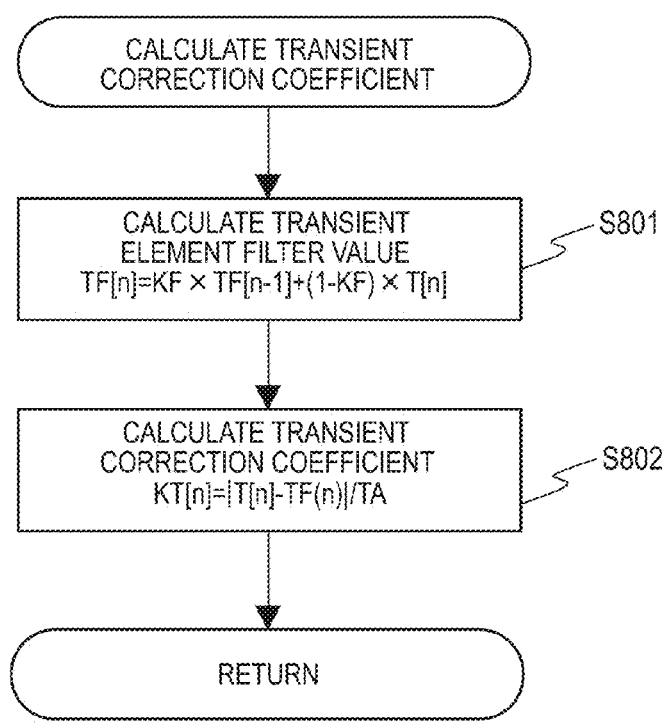
FIG. 11 is a flowchart depicting a calculation of a transient correction coefficient according to the first embodiment of the invention.

A calculation method of the transient correction coefficient KT will now be described using the flowchart of FIG. 11. Firstly in Step S801, a filter value TF is calculated by applying filter processing to average out an operating state value T detected by the operating state value detection portion 21 of FIG. 3. A filter coefficient KF used herein is preliminarily set so that a transient correction coefficient expected to be calculated in a predetermined transient operating state is calculated.

In subsequent Step S802, a difference between the operating state value T and the corresponding filter value TF is calculated, and the transient correction coefficient KT is calculated by dividing the difference by a reference value of the operating state value, TA. The transient correction coefficient KT is calculated as 1 when the operating state of the engine 1 is a transient state and as 0 when a steady state. The transient correction-coefficient KT can be calculated continuously between 0 and 1 when the operating state is a gradually accelerating state or a moderately accelerating state.

Referring to FIG. 5 again, in Step S202, the current value of the knocksignal, VP[n], is averaged out by performing filter processing in each stroke.

A calculation method of a filter coefficient KPN[n] will now be described using the flowchart of FIG. 6.

In Step S401, the filter coefficient KPN[n] is calculated by performing an interpolation operation using the current value of the transient correction coefficient, KT[n]. Herein, KPN1 is a filter coefficient matched to a transient operating state in which a highest responsiveness is required and KPN2 is a filter coefficient matched to a steady operating state.

In a case where filter processing is applied to the current value of the knock signal, VP[n], VPAO[n] may be used instead of VPAN[n−1]. By using VPAO[n], when a distribution of the knock signal is normalized on the basis of the average value of the current value of the knock signal, VP[n], it becomes possible to eliminate influences of a vibration component resulting from the occurrence of a knock at the spark timing following the occurrence of the knock.

In subsequent Step S203, VPA[n] is calculated by performing an interpolation operation between VPAO[n] calculated in Step S201 and VPAN[n] calculated in Step S202 using the transient correction coefficient KT[n] described above. In Step 3204, a knock signal VS, in which a standard deviation of the knock signal VP is normalized, is calculated by dividing the knock signal VP[n] by VPA[n].

Figure 9:
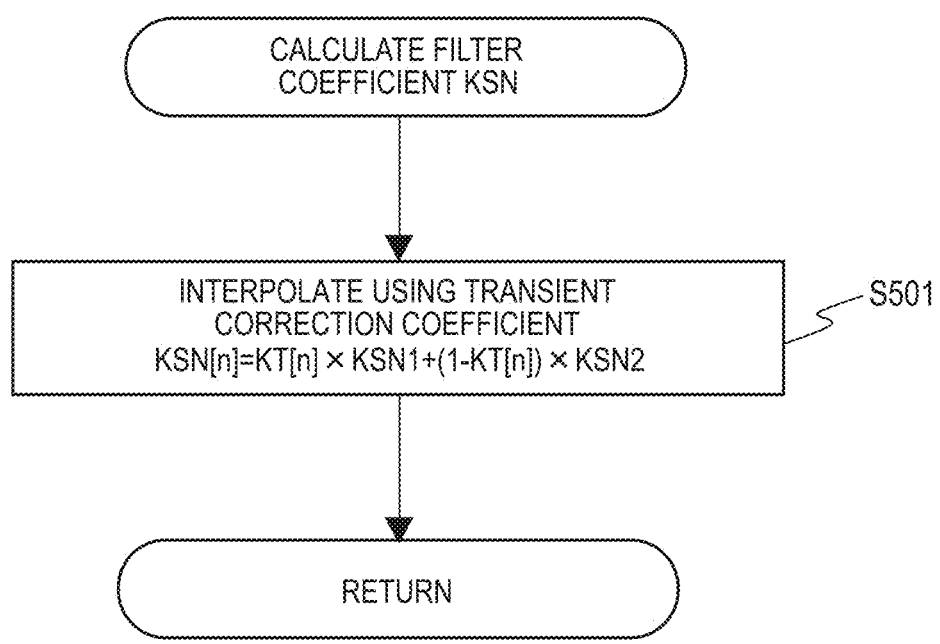
FIG. 9 is a flowchart depicting a calculation of a filter coefficient for level normalization according to the first embodiment of the invention.
Figure 10:
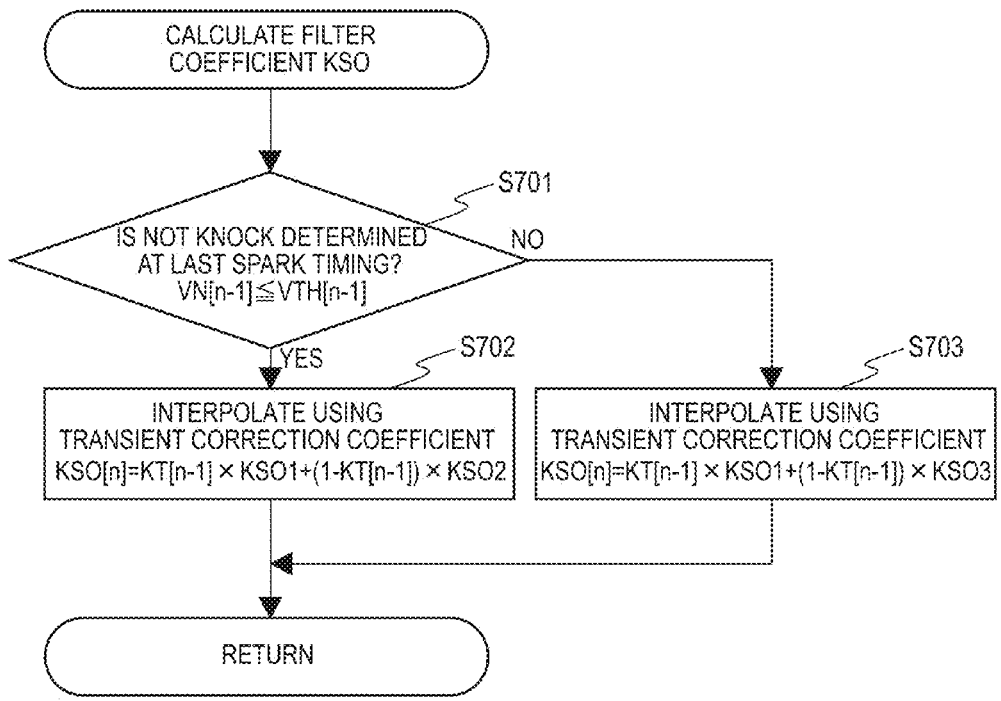
FIG. 10 is a flowchart depicting a calculation of a filter coefficient for level normalization according to the first embodiment of the invention.

Normalization of a knock signal level in Step S102 of FIG. 4 will now be described in detail using FIG. 8 through FIG. 10.

Figure 8:
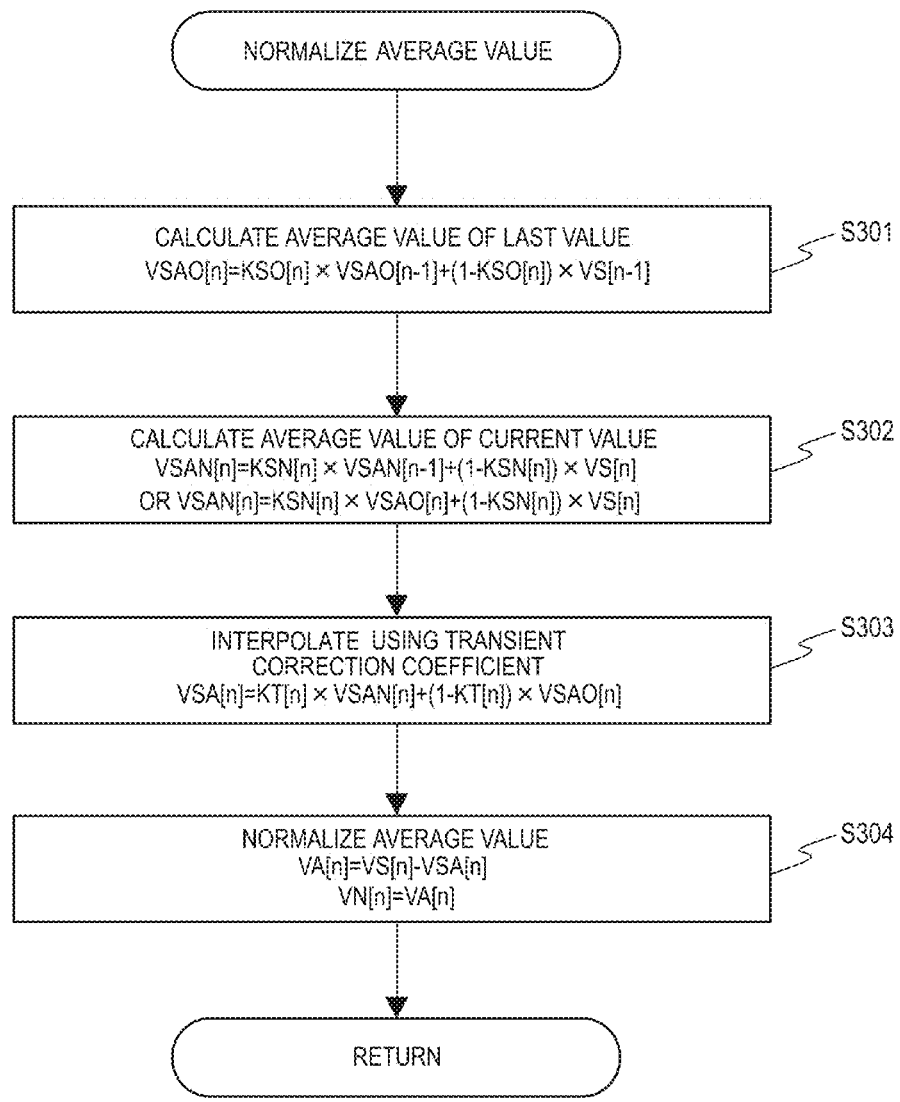
FIG. 8 is a flowchart depicting normalization of a knock signal level according to the first embodiment of the invention.

In Step S301 of FIG. 8, the last value of the knock signal, VS[n−1], is averaged out by performing filter processing in each stroke.

A calculation method of a filter coefficient KSO[n] will be described first using the flowchart of FIG. 10. Firstly in Step S701, it is determined whether a knock is determined at the last spark timing by comparing the last value of the normalized knock signal, VN[n−1], with the last value of the knock determination threshold, VTH[n−1]. In a case where it is found in Step S701 that a knock is not determined (if VN[n−1]≤VTH[n−1]), the flow proceeds to Step S702 in which the filter coefficient KSO[n] is calculated by performing an interpolation operation using the last value of the transient correction coefficient, KT[n−1]. In a case where it is found in Step S701 that a knock is determined (if VN[n−1]>VTH[n−1]), the flow proceeds to Step S703.

Herein, KSO1 is a filter coefficient matched to a transient operating state in which a highest responsiveness is required, KSO2 is a filter coefficient matched to a steady operating state, and KSO3 is a filter coefficient matched so that a vibration component resulting from a knock is excluded from the filter value. A value equal to or smaller than a value of KSN2 described below is set to KSO2. Owing to this setting, when a level of the knock signal is normalized on the basis of the average value of the last value of the knock signal, VS[n−1], normalization is unsusceptible to the vibration component resulting from the occurrence of a knock. Also, it becomes possible to normalize a level of the knock signal accurately even in a case where the transient correction coefficient and a variance of the knock signal have a low correlation or where the knock signal varies although the transient correction coefficient is not calculated.

Referring to FIG. 8 again, in Step S302, the current value of the knock signal, VS[n] is averaged out by performing filter processing in each stroke.

A calculation method of a filter coefficient KSN[n] will now be described using the flowchart of FIG. 9. In Step S501, the filter coefficient KSN[n] is calculated by performing an interpolation operation using the current value of the transient correction coefficient, KT[n]. Herein, KSN1 is a filter coefficient matched to a transient operating state in which a highest responsiveness is required and KSN2 is a filter coefficient matched to a steady operating state.

In a case where filter processing is applied to the current value of the knock signal, VS[n], VSAO[n] may be used instead of VSAN[n−1]. By using VPAO[n], when a level of the knock signal is normalized on the basis of the average value of the current value of the knock signal, VS[n], it becomes possible to eliminate influences of a vibration component resulting from the occurrence of a knock at the spark timing following the occurrence of the knock.

In subsequent Step S303, VSA[n] is calculated by performing an interpolation operation between VSAO[n] calculated in Step S301 and VSAN[n] calculated in Step S302 using the transient correction coefficient KT[n] described above. In Step S304, a knock signal VA, in which the average value of the knock signal VS is normalized, is calculated by subtracting VSA[n] from the knock signal VS[n]. The value thus calculated is used as the normalized knock signal VN[n] for calculation of the knock determination threshold thereafter.

FIG. 12 through FIG. 14C show operation examples representing advantages when the knock signal is normalized according to the processing method described above. In FIG. 12 through FIG. 14C, a line a represents a knock signal before normalization, a line b represents an average value of the knock signal before normalization, a line c represents a knock determination threshold before normalization. Also, a line d represents a knock signal after normalization, a line e represents an average value of the knock signal after normalization, and a line f represents a knock determination threshold after normalization.

FIG. 12 shows a state in which a knock occurs twice in succession in a steady operating state and a mark "X" on the knock signal indicates a knock.

Graph (1) in FIG. 12 shows an operation example in a case where a knock determination threshold c is calculated for a knock signal a that is not normalized.

Graphs (2) in FIG. 12 show operation examples in a case where a knock determination threshold f1 is calculated for a knock signal d1 that is normalized by the method described in Patent Document 1.

Graphs (3) in FIG. 12 show operation examples in a case where a knock determination threshold f2 is calculated for a knock signal d2 that is normalized by the method described in Patent Document 2.

Graphs (4) in FIG. 12 show operation examples in a case where a knock determination threshold f3 is calculated for a knock signal d3 that is normalized by the method described in the first embodiment of the invention.

In addition, graphs labeled with a capital A show a case where 0.96 is set to the filter coefficient used in filter processing when base statistics, such as an average value and a standard deviation used for normalization, are calculated. Graphs labeled with a capital B show a case where 0.85 is set to the filter coefficient used in filter processing when the base statistics, such as an average value and a standard deviation used for normalization, are calculated.

Further, Graph (4)-B in FIG. 12 shows a case where 0.85 is set to the filter coefficient used in filter processing applied to the last value of a knock signal and 0.96 is set to the filter coefficient used in filter processing applied to the current value of a knock signal.

In Graph (2)-A in FIG. 12, normalization is performed using the base statistics (standard deviation and average value) highly correlated with a vibration component resulting from the occurrence of a knock on the basis of the current value of the knock signal d1. Hence, the vibration component resulting from the occurrence of a knock highly correlated with the standard deviation is normalized as well. Accordingly, in comparison with Graph (1) in FIG. 12 in which normalization is not performed, the vibration component resulting from the occurrence of a knock is reduced.

In addition, a vibration component resulting from the second occurrence of a knock is normalized using the base statistics calculated in consideration of influences of the vibration component resulting from the first occurrence of a knock. Hence, the vibration component resulting from the second occurrence of a knock is reduced further.

In Graph (2)-B in FIG. 12, by accelerating tracking of the calculation of the base statistics used for normalization, vibration components resulting from knocks are reduced markedly in comparison with Graph (2)-A in FIG. 12.

In Graph (3)-A in FIG. 12, normalization is performed on the basis of the current value of the knock signal d2 using a base statistic (average value) less correlated with a vibration component resulting from the occurrence of a knock than a standard deviation. Hence, in comparison with Graph (1) in FIG. 12 in which normalization is not performed, a vibration component resulting from the first occurrence of a knock is hardly reduced. However, because a vibration component resulting from the second occurrence of a knock is normalized using the base statistics calculated in consideration of the influences of the vibration component resulting from the first occurrence of a knock, the vibration component resulting from the second occurrence of a knock is reduced.

In Graph (3)-B in FIG. 12, by accelerating tracking of the calculation of the base statistics used for normalization, the vibration components resulting from knocks are reduced markedly in comparison with Graph (3)-A in FIG. 12.

In contrast, in Graph (4)-A in FIG. 12, normalization is performed on the basis of the last value of the knock signal d3 using the base statistic (average value) less correlated with a vibration component resulting from the occurrence of a knock than the standard deviation. Hence, it becomes possible to reflect a result of a knock determination when the base statistics used for normalization are calculated. Accordingly, a vibration component resulting from the occurrence of a knock is prevented from being normalized as well. Consequently, a vibration component resulting from neither the first nor the second occurrence of a knock is reduced.

In Graph (4)-B in FIG. 12, even when tracking of the base statistics calculated on the basis of the last value of the knock signal d3 is accelerated, a vibration component resulting from the occurrence of a knock is hardly reduced for the same reason as in Graph (4)-A in FIG. 12. An advantage achieved by accelerating the tracking of the filter processing to the last value of the knock signal in Graph (4)-B in FIG. 12 will be described below with reference to FIGS. 14A to 14C.

Figure 13A:
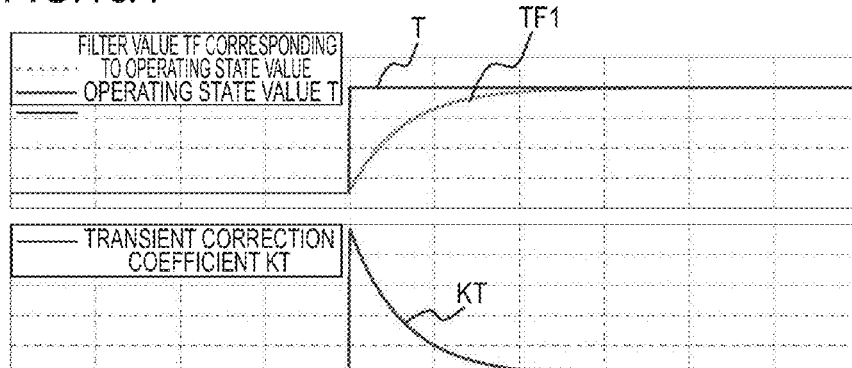
FIGS. 13A to 13E show operation examples of the normalization of a knock signal in a transient state without the occurrence of a knock according to the first embodiment of the invention.

FIGS. 13A to 13E show states in which the operating state value T varies step-wise. FIG. 13A shows the operating state value T, the filter value TF corresponding to the operating state value, and the transient correction coefficient KT.

Figure 13B:
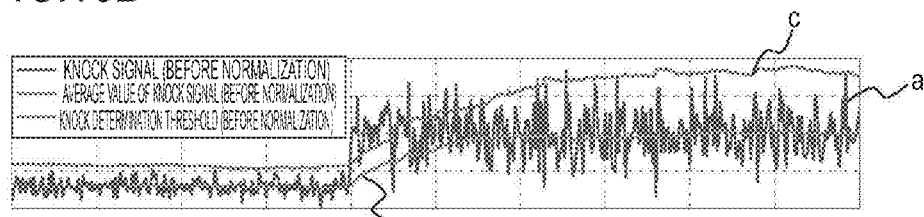

FIG. 13B shows an operation example in a case where the knock determination threshold c is calculated for a knock signal a that is not normalized.

Figure 13C:
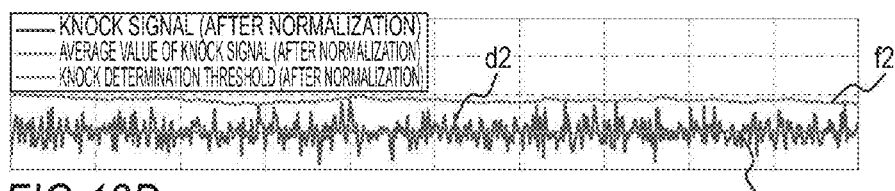

FIG. 13C shows an operation example in a case where the knock determination threshold f2 is calculated for a knock signal d2 that is normalized by the method described in Patent Document 2.

Figure 13D:
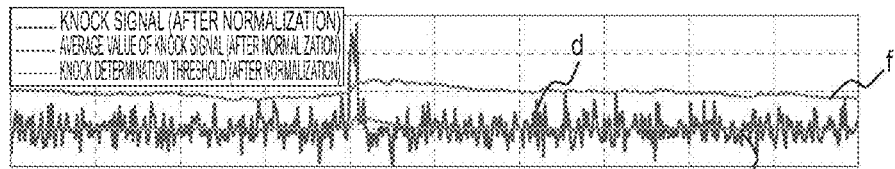

FIG. 13D shows an operation example in a case where a knock determination threshold f is calculated for a knock signal d that is normalized using the average value of the last value of a knock signal.

Figure 13E:
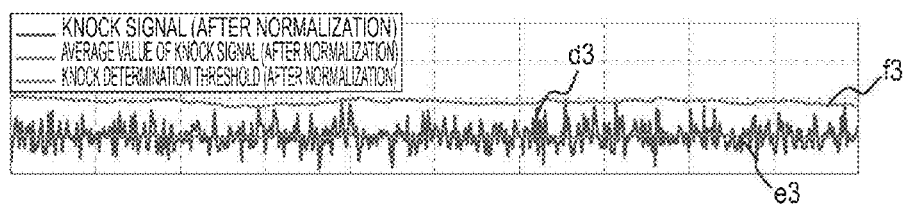

FIG. 13E shows an operation example in a case where a knock determination threshold f3 is calculated for a knock signal d3 that is normalized by the method described in the first embodiment of the invention.

In FIG. 13B, an erroneous knock detection occurs during a transient operation. Also, because the filter coefficient for the filter processing is set to a large value due to the erroneous knock detection, the erroneous knock detection continues for a long period.

In FIG. 13C, by performing normalization on the basis of the current value of the knock signal, normalization is performed without a delay from a change of the operating state. Hence, no erroneous knock detection occurs.

In FIG. 13D, normalization is performed on the basis of the last value of the knock signal alone. Hence, normalization is delayed from a change of the operating state value T and an erroneous knock detection occurs. However, because the knock signal is normalized later, the erroneous knock detection does not continue for a long period in comparison with FIG. 13B.

In contrast, in FIG. 13E, because normalization is performed on the basis of the current value of the knock signal in response to a calculation of the transient correction coefficient KT, no erroneous knock detection occurs as in FIG. 13C.

Figure 14A:
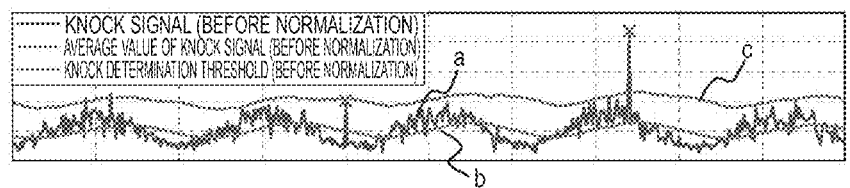
FIGS. 14A to 14C show operation examples of the normalization of a knock signal in a state in which the knock signal varies with the occurrence of a knock according to the first embodiment of the invention.
Figure 14B:
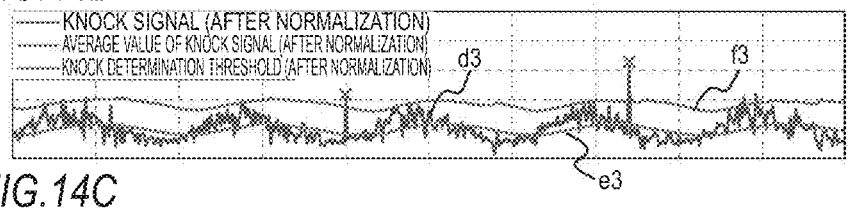
Figure 14C:
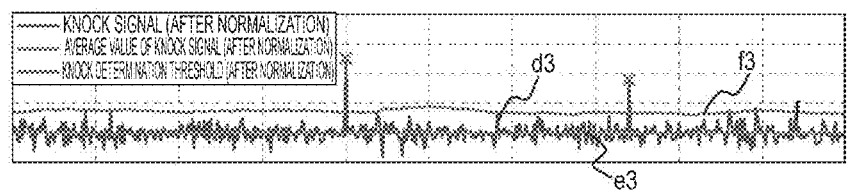

FIGS. 14A to 14C show states in which a knock signal varies while there is no variance of the operating state value. A mark "X" on the knock signal indicates the occurrence of a knock.

FIG. 14A shows an operation example in a case where a knock determination threshold c is calculated for a knock signal a that is not normalized.

FIG. 14B shows an operation example in a case where a knock determination threshold f3 is calculated for a knock signal d3 that is normalized by the method described in the first embodiment of the invention. Herein, 0.96 is set to the filter coefficient in the filter processing for the last value of the knock signal.

FIG. 14C shows an operation example in a case where a knock determination threshold f3 is calculated for a knock signal d3 that is also normalized by the method described in the first embodiment of the invention. Herein, 0.85 is set only to the filter coefficient in the filter processing for the last value of the knock signal.

In FIG. 14A, the knock determination threshold c is not calculated adequately and an erroneous knock detection and omission of a knock detection occur. In FIG. 14B, the knock signal is normalized in comparison with FIG. 14A and omission of a knock detection does not occur. However, vibrations of the knock signal d3 are not eliminated.

In contrast, in FIG. 14C, by accelerating the tracking of the base statistics calculated on the basis of the last value of the knock signal d3, it becomes possible to normalize a variance of the knock signal d3 accurately. Hence, a knock can be detected accurately.

By normalizing the knock signal as above, it becomes possible to set the knock determination threshold level adequately independently of a change of the operating state without having to perform delicate matching. Further, deterioration of vibration components resulting from a knock can be suppressed by normalization of the knock signal.

The knock control apparatus for an internal combustion engine of the invention described above has the following characteristics.

(1) The knock control apparatus for an internal combustion engine of the invention includes: a sensor that outputs a signal corresponding to a combustion state of the internal combustion engine; a knock signal calculation portion that calculates, as a knock signal, a characteristic component of a knock using the output from the sensor at every spark timing; a knock signal normalization portion that normalizes the knock signal using a base statistic calculated on the basis of the knock signal; a knock determination threshold calculation portion that sets a knock determination threshold on the basis of the normalized knock signal; a knock determination portion that determines an occurrence of a knock in a case where the normalized knock signal exceeds the knock determination threshold set by the knock determination threshold calculation portion; and an operating state determination portion that determines an operating state of the internal combustion engine. The knock signal normalization portion calculates a base statistic 1 on the basis of a current value of the knock signal, a base statistic 2 on the basis of a last value of the knock signal, and a base statistic 3 by interpolating between the base statistic 1 and the base statistic 2 according to a determination result by the operating state determination portion. The knock signal normalization portion normalizes the knock signal using the calculated base statistic 3. The base statistic 3 is calculated in reference to the base statistic 2 in a state in which the operating state determination portion determines that the internal combustion engine is not in an operating state such that accompanies a variance of the knock signal, and in a state in which the operating state determination portion determines that the internal combustion engine is in an operating state such that accompanies a variance of the knock signal, influences of the base statistic 1 are calculated more significantly into the base statistic 3 as a measure of the variance of the knock signal increases.

According to the configuration as above, in a state in which it is determined that the internal combustion engine is not in an operating state such that accompanies a variance of the knock signal, by normalizing the knock signal using the base statistics calculated on the basis of the last value of the knock signal, the knock signal is prevented from being normalized by a vibration component resulting from the occurrence of a knock. It thus becomes possible to enhance a knock detection performance. Also, in a state in which it is determined that the internal combustion engine is in an operating state such that accompanies a variance of the knock signal, by normalizing the knock signal using base statistics calculated on the basis of the current value of the knock signal, it becomes possible to suppress an erroneous knock detection even in a case where an average value and a standard deviation of the knock signal vary with a change of the operating state.

(2) The knock control apparatus for an internal combustion engine of the invention is configured in such a manner that the base statistic 1 and the base statistic 2 are calculated by applying filter processing to the knock signal and a filter coefficient 2 used for a calculation of the base statistic 2 is set in such a manner that tracking thereof becomes equal to or more accelerated than tracking of a filter coefficient 1 used for a calculation of the base statistic 1.

According to this configuration, by accelerating the tracking of the base statistic 2 calculated on the basis of the last value of the knock signal, it becomes possible to suppress an erroneous knock detection caused by a variance of the knock signal even in a case where determination accuracy of the operating state is poor.

(3) The knock control apparatus for an internal combustion engine of the invention is configured in such a manner that when the knock determination portion determines that a knock occurred at last spark timing, the characteristic component of the knock is excluded when the base statistic 2 is calculated.

According to this configuration, influences of a vibration component resulting from the occurrence of a knock are not given to a calculation of the base statistic 2 at the spark timing following the occurrence of the knock. Hence, it becomes possible to set the knock determination threshold adequately in a case where normalization is performed on the basis of the base statistic 2. Consequently, a knock detection performance can be enhanced.

(4) The knock control apparatus for an internal combustion engine of the invention is configured in such a manner that a calculated value of the base statistic 2 is used as a last value of filter processing used for a calculation of the base statistic 1.

According to the configuration above, influences of a vibration component resulting from the occurrence of a knock are not given to a calculation of the base statistic 1 at the spark timing following the occurrence of the knock. Hence, it becomes possible to set the knock determination threshold adequately in a case where normalization is performed on the basis of the base statistic 1. Consequently, a knock detection performance can be enhanced.

Various modifications and alterations of this invention will be apparent to those skilled in the art without departing from the scope and spirit of this invention, and it should be understood that this is not limited to the illustrative embodiments set forth herein.

What is claimed is:

1. A knock control apparatus for an internal combustion engine, comprising:
   a sensor that outputs a signal corresponding to a combustion state of the internal combustion engine;
   a knock signal calculation portion that calculates, as a knock signal, a characteristic component of a knock using the output from the sensor at every spark timing;
   a knock signal normalization portion that normalizes the knock signal using a base statistic calculated on the basis of the knock signal;
   a knock determination threshold calculation portion that sets a knock determination threshold on the basis of the normalized knock signal;
   a knock determination portion that determines an occurrence of a knock in a case where the normalized knock signal exceeds the knock determination threshold set by the knock determination threshold calculation portion; and
   an operating state determination portion that determines an operating state of the internal combustion engine, wherein
   the knock signal normalization portion calculates,
      a base statistic 1 on the basis of a current value of the knock signal,
      a base statistic 2 on the basis of a last value of the knock signal, and
      a base statistic 3 by interpolating between the base statistic 1 and the base statistic 2 according to a determination result by the operating state determination portion;
   the knock signal normalization portion normalizes the knock signal using the calculated base statistic 3; and
   the base statistic 3 is calculated in reference to the base statistic 2 in a state in which the operating state determination portion determines that the internal combustion engine is not in an operating state such that accompanies a variance of the knock signal, and in a state in which the operating state determination portion determines that the internal combustion engine is in an operating state such that accompanies a variance of the knock signal, influences of the base statistic 1 are calculated more significantly into the base statistic 3 as a measure of the variance of the knock signal increases.

2. The knock control apparatus for an internal combustion engine according to claim 1, wherein
   the base statistic 1 and the base statistic 2 are calculated by applying filter processing to the knock signal and a filter coefficient 2 used for a calculation of the base statistic 2 is set in such a manner that tracking thereof becomes equal to or more accelerated than tracking of a filter coefficient 1 used for a calculation of the base statistic 1.

3. The knock control apparatus for an internal combustion engine according to claim 1, wherein
   when the knock determination portion determines that a knock occurred at last spark timing, the characteristic component of the knock is excluded when the base statistic 2 is calculated.

4. The knock control apparatus for an internal combustion engine according to claim 1, wherein
   a calculated value of the base statistic 2 is used as a last value of filter processing used for a calculation of the base statistic 1.

* * * * *